United States Patent [19]

Fulton

[11] Patent Number: 5,069,099
[45] Date of Patent: Dec. 3, 1991

[54] SHEAR WITH STORABLE SQUARING ARM
[75] Inventor: Wayne L. Fulton, Rockford, Ill.
[73] Assignee: W. A. Whitney Corp., Rockford, Ill.
[21] Appl. No.: 646,242
[22] Filed: Jan. 28, 1991
[51] Int. Cl.[5] .............................................. B26D 7/01
[52] U.S. Cl. ................................. 83/468.6; 83/468.1; 83/694; 269/303; 269/315
[58] Field of Search ................. 83/467.1, 468.1, 468.5, 83/468.6, 468.2, 468.7, 419, 421, 446, 448, 694; 269/303, 304, 305, 315, 901

[56] References Cited

U.S. PATENT DOCUMENTS

| | | | |
|---|---|---|---|
| 2,238,857 | 4/1941 | Ford | 83/468.7 |
| 2,740,437 | 4/1956 | Odlum et al. | 83/421 X |
| 2,890,729 | 6/1959 | Horn | 269/315 |
| 4,206,910 | 6/1980 | Biesemyer | 269/303 X |
| 4,257,296 | 3/1981 | Short | 83/468.6 X |

Primary Examiner—Mark Rosenbaum
Assistant Examiner—Eugenia A. Jones
Attorney, Agent, or Firm—Leydig, Voit & Mayer

[57] ABSTRACT

A storable squaring arm for use with a shear and comprising a forward section and a rear section which extend substantially parallel to the rails of the work-piece-supporting stand of the shear. The rear end of the forward section is pivotally attached to the forward end of the rear section to swing about a transversely extending axis. The rear section is pivotally attached to one of the rails to swing about a longitudinally extending axis. In order to store the squaring arm, the forward section is pivoted rearwardly about the transverse axis to a folded position on top of the rear section. The rear section is then pivoted about the longitudinal axis to a stored position below the top of the rail.

5 Claims, 4 Drawing Sheets

SHEAR WITH STORABLE SQUARING ARM

FIELD OF THE INVENTION

The present invention relates generally to a shear and more particularly to a squaring arm used to locate a workpiece in a predetermined position relative to the shear.

BACKGROUND OF THE INVENTION

In a conventional shear, a large sheet metal workpiece is supported on a stand formed by horizontal rails and vertical legs and is advanced along the stand and onto the shear bed where the workpiece is cut into smaller pieces by upper and lower cutting blades. The shear utilizes a squaring arm to keep the leading edge of the workpiece parallel to the cutting blades so that a square cut may be made.

In many instances, it is advantageous to be able to utilize the entire length of the cutting blades of the shear. Heretofore, the squaring arm has been a fixed part of the workpiece stand, and the location of the squaring arm prevents the effective utilization of the entire length of the cutting blades. Even where it is possible to remove the squaring arm from the stand, cumbersome and time-consuming procedures are required.

OBJECTS AND SUMMARY OF THE INVENTION

The general aim of the present invention to provide a shear having an easily storable squaring arm which enables the shear to be quickly converted to cut relatively wide workpieces through utilization of the entire length of the cutting blades.

A more detailed object of the invention is to achieve the foregoing by providing a squaring arm which may be folded upon itself and then pivoted to an out of the way position on the workpiece stand.

Another object is to provide a squaring arm which can be quickly and easily shifted between active and stored positions without need of disassembling the squaring arm from the workpiece stand.

These and other objects and advantages of the invention will become more apparent from the following detailed description when taken in conjunction with the accompanying drawings.

Figure 1:
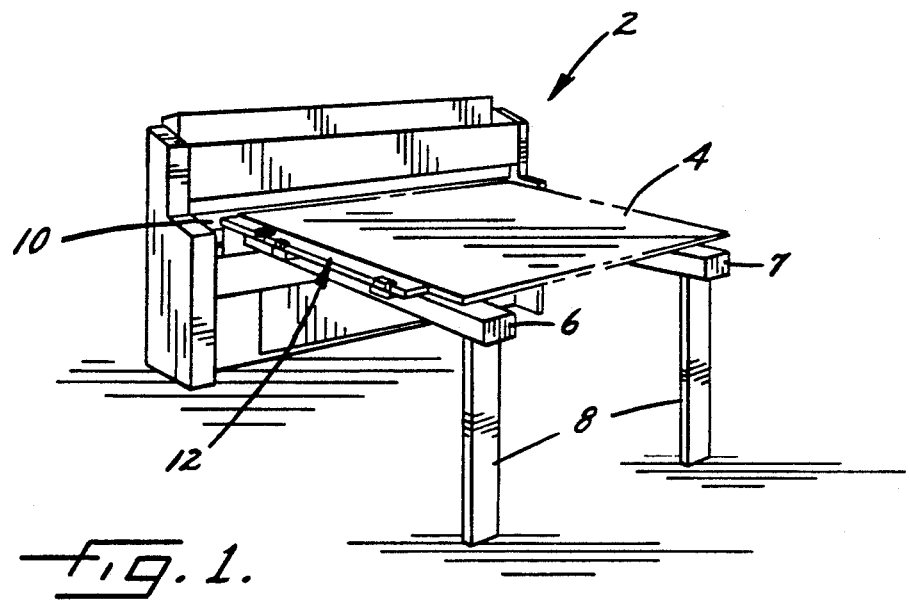
FIG. 1 is a perspective view showing a conventional shear equipped with a new and improved storable squaring arm incorporating the unique features of the present invention.

While the invention is susceptible to various modifications and alternative constructions, certain illustrative embodiments have been shown in the drawings and will be described below in detail. It should be understood, however, that there is no intention to limit the invention to the specific forms disclosed but, on the contrary, the intention is to cover all modifications, alternative constructions and equivalents falling within the spirit and scope of the invention as defined by the appended claims.

DETAILED DESCRIPTION OF THE PREFERRED EMBODIMENT

Turning to the drawings, there is shown in FIG. 1 a conventional shear 2 for cutting an initially large sheet metal workpiece 4 into smaller pieces. The workpiece is supported on a conventional stand formed by two horizontal rails 6 and 7 and two vertical legs 8. During the shearing operation, the workpiece 4 lies on the rails 6 and 7 and is positioned with one longitudinally extending edge against a squaring arm 12 on the rail 6. The leading end portion of the workpiece rests on the bed 10 of the shear and is adapted to be cut by upper and lower shear blades (not shown).

It will be appreciated that when the longitudinally extending edge of the workpiece 4 is located against the squaring arm 12, the leading edge of the workpiece is located parallel to the cutting blades of the shear. Thus, the cuts in the workpiece are made at right angles to its longitudinal edges.

Figure 2:
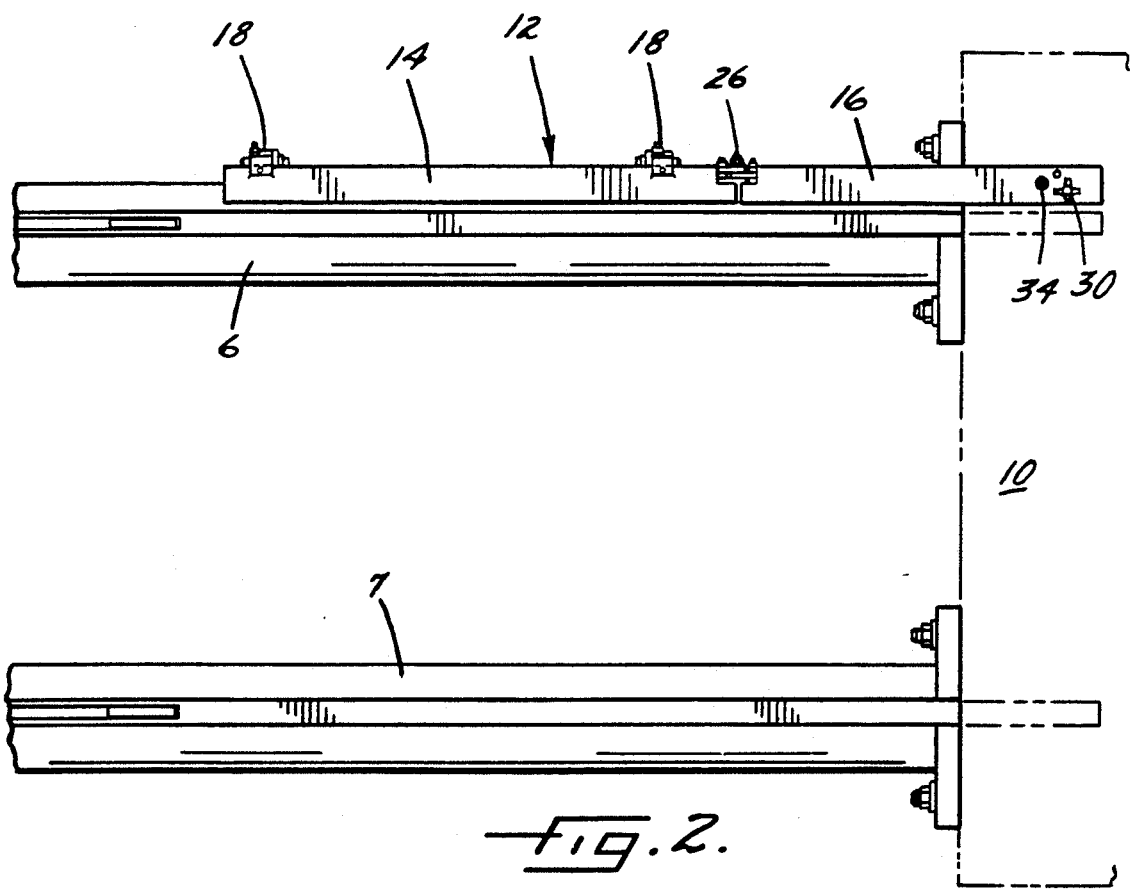
FIG. 2 is an enlarged fragmentary top plan view of the shear and squaring arm illustrated in FIG. 1, the squaring arm being shown in its active position.
Figure 3:
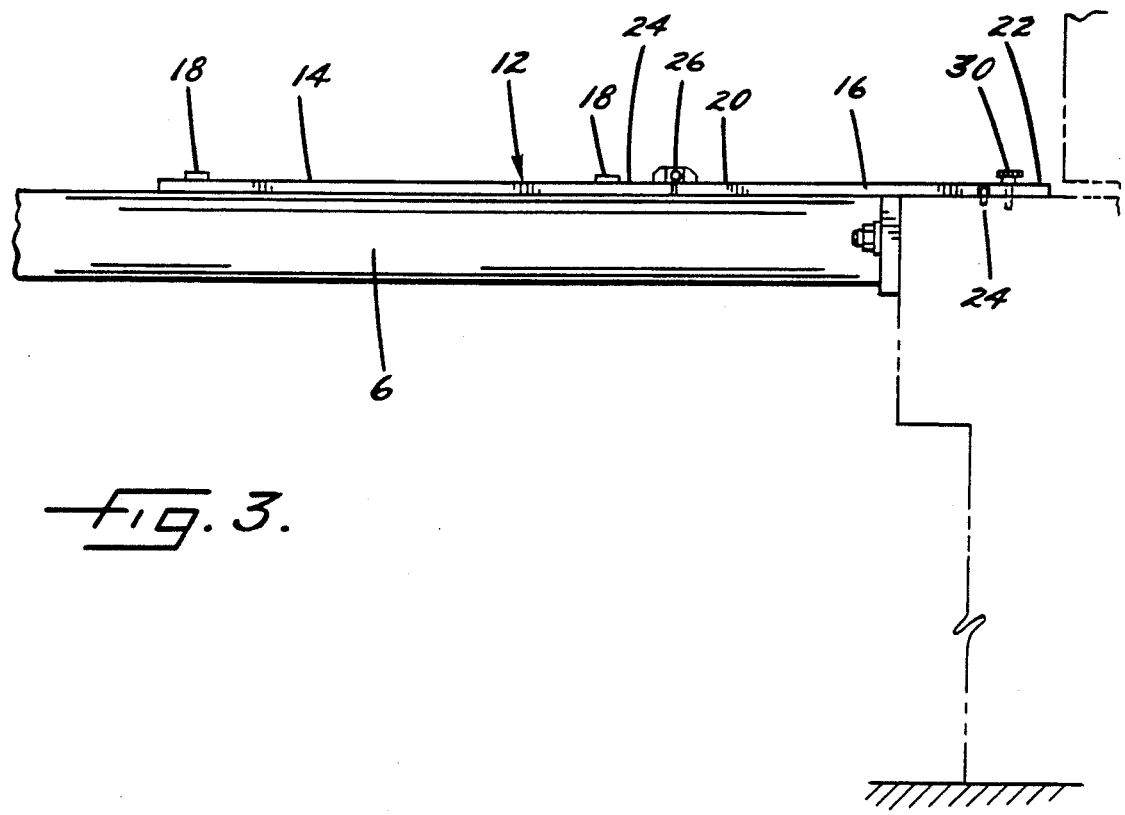
FIG. 3 is a fragmentary elevational view of the shear and squaring arm shown in FIG. 2.

In accordance with the present invention, the squaring arm 12 is adapted to be moved quickly and easily to an inactive or stored position in which the squaring arm exposes the entire length of the cutting blades of the shear 2 so as to enable the cutting of extremely wide workpieces. When in its active position, the storable squaring arm 12 functions the same as a conventional squaring arm and extends along the longitudinal axis of the rail 6 as shown in FIGS. 2 and 3.

Figure 4:
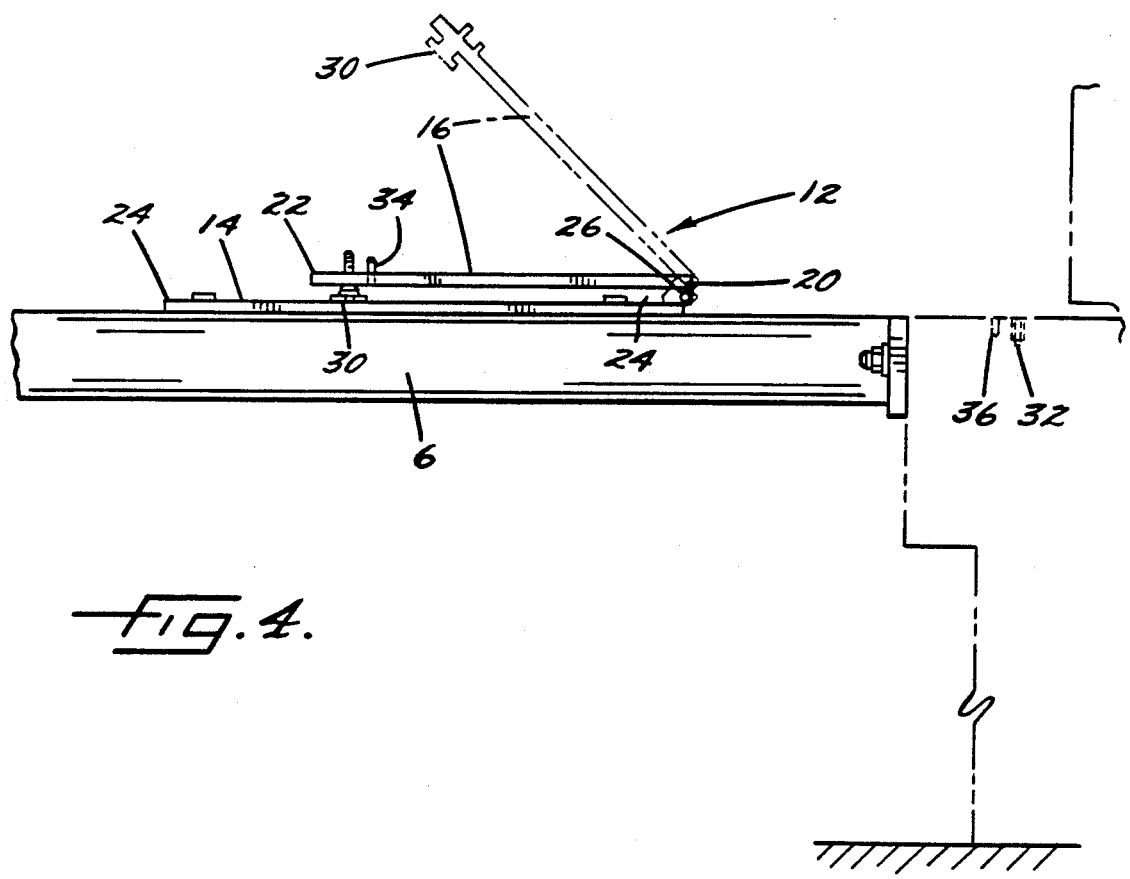
FIG. 4 is an elevational view similar to FIG. 3 but shows the first step of storing the squaring arm.
Figure 5:
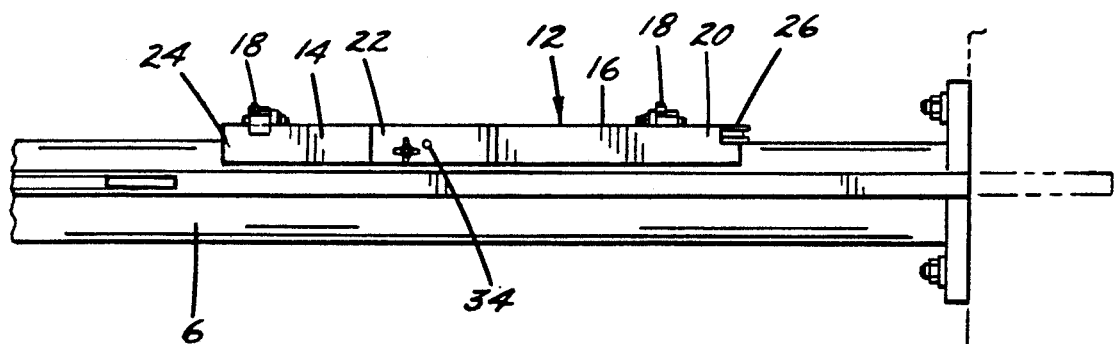
FIG. 5 is a top plan view similar to FIG. 2 and showing the first step of storing the squaring arm.
Figure 5:
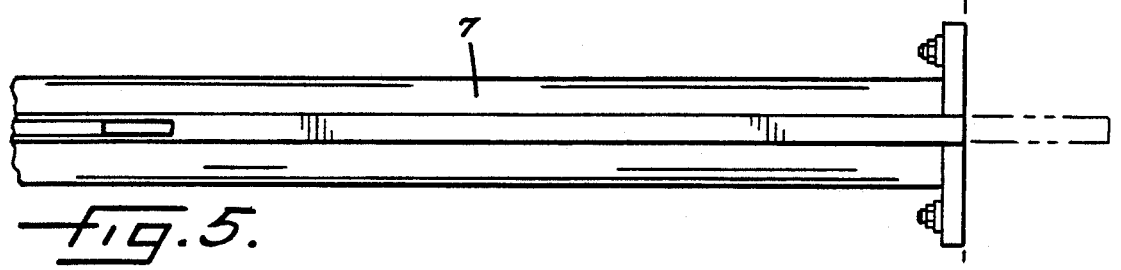

Pursuant to the invention, the squaring arm 12 has a rear section 14 and a forward section 16. The rear section 14 is pivotally attached to the rail 6 by two longitudinally spaced hinges 18 so that it can rotate about a longitudinally extending horizontal axis which is generally parallel to the rail 6. As shown in FIGS. 3 and 4, the rear end 20 of the forward section 16 is pivotally attached to the forward end 24 of the rear section 14 by a hinge 26 so that the forward section can pivot about a horizontal axis extending transversely of the rail 6.

Figure 9:
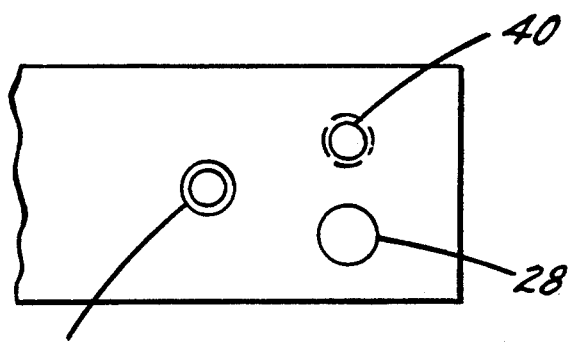
FIG. 9 is an enlarged top plan view of the front end portion of the squaring arm.
Figure 8:
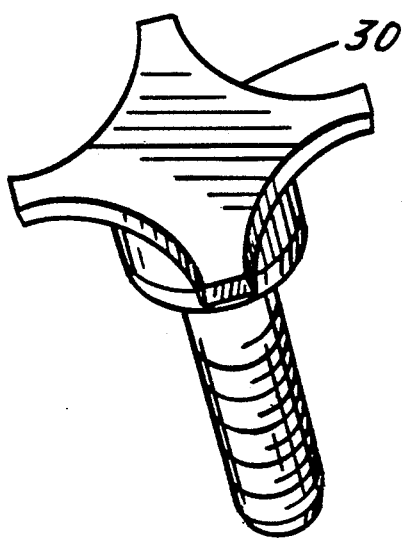
FIG. 8 is a perspective view of a locking knob for the squaring arm.

The forward section 16 of the squaring arm 12 is adapted to be attached to the bed 10 of the shear 2 when the squaring arm is in its active position. For this purpose, the forward end portion 20 of the forward section is formed with a plain hole 28 (FIG. 9) for accepting a threaded knob 30 (FIG. 8). As shown in FIG. 4, the knob 30 is adapted to be threaded into a tapped hole 32 formed in the shear bed 10 thus securing the forward section 16 to the bed during a normal shearing operation when the squaring arm is in active use. To insure accurate positioning of the forward section 16, a locating pin 34 (FIG. 3) is fixed rigidly to and depends from the forward section. When the forward section is in its active position, the locating pin dowels slidably but snugly into a longitudinally elongated locating hole 36

(FIG. 4) formed in the shear bed 10. Thus, the forward section 16 is precisely located by the pin 34 and is locked to the bed by the knob 30.

In order to store the squaring arm 12, the locking knob 30 is unscrewed from the tapped hole 32, is withdrawn from the plain hole 28 and is rescrewed into a tapped hole 40 (FIG. 9) formed in the forward section 16 alongside the hole 28 and adapted to receive the locking knob for storage purposes. The forward section 16 of the squaring arm then is swung rearwardly about the hinge 26 as shown in phantom in FIG. 4 and is swung downwardly to a folded position over the rear section 14 as shown in solid lines in FIG. 4. In the folded position of the forward section 16, the locking knob 30 rests on the upper side of the rear section 14 and keeps the forward section generally parallel to the rear section. Also, the forward section rests on a bracket 50 extending from the rail 6 in order to prevent the forward section from swinging downwardly about the hinge 26.

Figure 6:
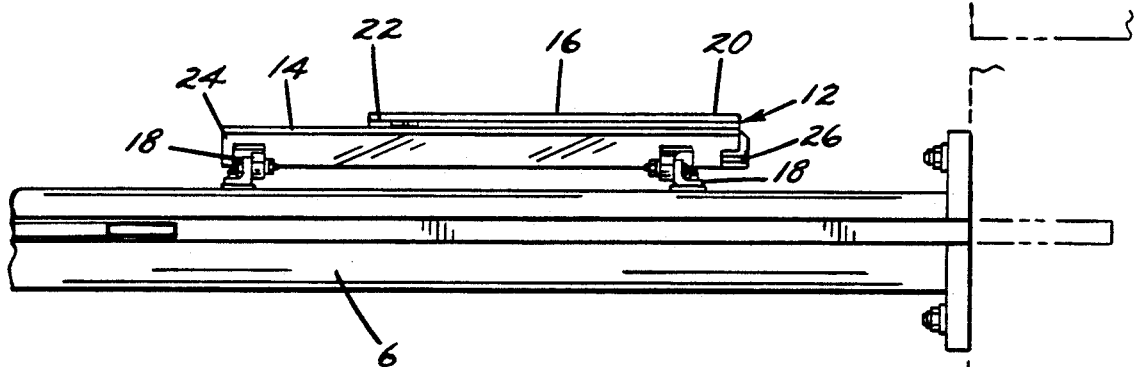
FIG. 6 also is a top plan view similar to FIG. 2 but shows the second step of storing the squaring arm.
Figure 6:
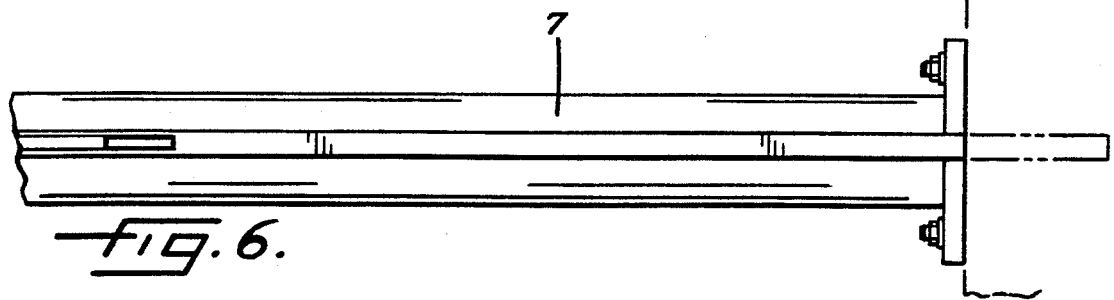
Figure 7:
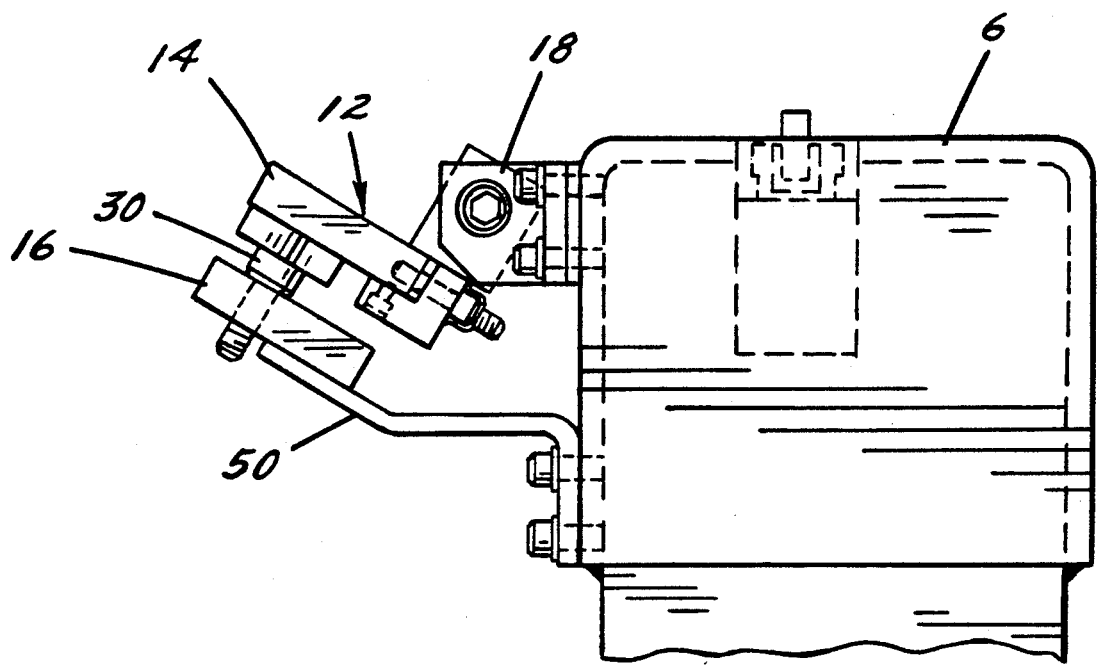
FIG. 7 is a front view showing the squaring arm fully stored.

After the forward section 16 has been swung clear of the shear bed 10 and folded onto the rear section 14, the entire squaring arm 12 is rolled to the stored position shown in FIGS. 6 and 7 by pivoting the rear section 14 about the hinges 18. In this way, the squaring arm is swung clear of the upper side of the rail 6 so as to enable a wide workpiece to be placed on the rails 6 and 7 and cut by the entire length or substantially the entire length of the blades of the shear.

The squaring arm 12 may be returned to its active position by swinging the rear section 14 reversely about the hinges 18, by swinging the forward section 16 upwardly and then downwardly about the hinge 26 and by causing the locating pin 34 to dowel into the hole 36. After the locking knob 30 has been unscrewed from the tapped hole 40, it is inserted through the plain hole 28 and is threaded in the tapped hole 32 to secure the forward section 16 to the shear bed 10.

I claim:

1. A storable squaring arm for use with a shear for cutting a workpiece and associated with an elongated rail for supporting the workpiece during cutting, said squaring arm having forward and rear sections each having front and rear end portions, means mounting said rear section on said rail for pivoting about a first axis extending longitudinally of the rail, means connecting the rear end portion of said forward section to the front end portion of said rear section and supporting said forward section for pivoting about a second axis extending transversely of said rail, and means for releasably securing the front end portion of said forward section to said shear.

2. A storable squaring arm as defined in claim 1 in which said securing means comprise a knob having a threaded portion, a plain hole in said forward section and normally receiving the threaded portion of said knob, and a tapped hole in said forward section and receiving the threaded portion of said knob when said forward section is released from said shear.

3. A storable squaring arm as defined in claim 1 further including a locating pin projecting downwardly from the front end portion of said forward section.

4. The combination of, a shear for cutting a workpiece, a stand having an elongated rail for supporting the workpiece during cutting and extending rearwardly from said shear, and a squaring arm for locating the workpiece in a predetermined orientation relative to said shear, said squaring arm having forward and rear sections each having front and rear end portions, means mounting said rear section on said rail for pivoting about an axis extending longitudinally of the rail between an active position in which the rear section is located above the rail and a stored position in which the rear section is located below the rail, means connecting the rear end portion of said forward section to the front end portion of said rear section and supporting said forward section to pivot between active and inactive positions about an axis extending transversely of said rail, said forward section extending forwardly from and lying in substantially the same plane as said rear section when said forward section is in said active position, said forward section being folded on top of said rear section when said forward section is in its inactive position, and means for releasably securing the front end portion of said forward section to said shear when said forward section is in its active position.

5. The combination defined in claim 4 further including a locating pin carried by and depending from the front end portion of said forward section, and an upwardly opening hole formed in said shear and slidably but snugly receiving said locating pin when said forward section is in its active position.

* * * * *